US012705641B2

(12) United States Patent
Cohen et al.

(10) Patent No.: US 12,705,641 B2
(45) Date of Patent: Aug. 11, 2026

(54) SYSTEM AND METHOD FOR OPTIMIZING CROSS-CHANNEL MARKETING

(71) Applicant: Plus Company Canada Inc., Quebec (CA)

(72) Inventors: Michael A. Cohen, New York, NY (US); Philip Anthony Austin, El Dorado Hills, CA (US); Saachi Minocha, Plano, TX (US); Alex Côté, Chambly (CA); Peter Ungberg, Queens, NY (US)

(73) Assignee: PLUS AIOS LIMITED, Quebec (CA)

( * ) Notice: Subject to any disclaimer, the term of this patent is extended or adjusted under 35 U.S.C. 154(b) by 0 days.

(21) Appl. No.: 18/774,462

(22) Filed: Jul. 16, 2024

(65) Prior Publication Data

US 2025/0148500 A1 May 8, 2025

Related U.S. Application Data

(60) Provisional application No. 63/547,247, filed on Nov. 3, 2023.

(51) Int. Cl.
*G06Q 30/02* (2023.01)
*G06Q 30/0241* (2023.01)
*G06Q 30/0242* (2023.01)

(52) U.S. Cl.
CPC ..... *G06Q 30/0244* (2013.01); *G06Q 30/0276* (2013.01)

(58) Field of Classification Search
None
See application file for complete search history.

(56) References Cited

U.S. PATENT DOCUMENTS

| | | | | |
|---|---|---|---|---|
| 7,076,504 | B1 * | 7/2006 | Handel | G06Q 30/0239 707/999.005 |
| 8,311,863 | B1 * | 11/2012 | Kemp | G06Q 10/0639 705/7.29 |
| 8,719,105 | B2 * | 5/2014 | Minnis | G06Q 30/02 705/26.7 |
| 11,625,736 | B2 * | 4/2023 | Mehmanpazir | G06Q 30/0202 705/7.31 |
| 2022/0270128 | A1 * | 8/2022 | Padmanabhan | G06Q 30/0201 |
| 2024/0362676 | A1 * | 10/2024 | Bangad | G06Q 30/0211 |
| 2025/0217843 | A1 * | 7/2025 | Potter | G06F 3/0484 |

OTHER PUBLICATIONS

Wang, Zhenyl; Zhang, Hongcal, Customized Load Profiles Synthesis for Electricity Customers Based on Conditional Diffusion Models (English), Apr. 24, 2023, (Year: 2023).*

* cited by examiner

*Primary Examiner* — Marilyn G Macasiano
(74) *Attorney, Agent, or Firm* — Shun Yao; Yao Legal Services, Inc.

(57) ABSTRACT

One embodiment can provide a method and system for optimizing marketing plans. During operation, the system can collect historical customer data from a plurality of data sources, apply a machine learning technique to train a customer model based at least on the historical customer data, and obtain an initial marketing plan, which specifies a plan goal and one or more constraints. The system can perform an optimization process based on the initial marketing plan and the customer model. The system can further generate and present a report based on the optimization process, the report comprising an optimized marketing plan, thereby facilitating future marketing efforts based on the optimized marketing plan.

18 Claims, 10 Drawing Sheets

USER DATA
202
KPI-CONVERSION DATA
204
MEDIA DATA
206
DEMOGRAPHIC DATA
208
MODEL-TRAINING UNIT
210
USER SIMULATION UNIT
214
TOUCHPOINT SIMULATION UNIT
216
ESTIMATED MODEL PARAMETERS
SIMULATED TOUCPOINT DATA
SIMULATED USER DATA
INFERENCE UNIT
212
PREDICTED TOUCHPOINT ATTRIBUTION

| | USER ID | Sales_timestamp | Exposure_timestamp | network | tactic | Genre | creative_id |
|---|---|---|---|---|---|---|---|
| 1 | IgUs7l8apkJ98 | 2018-10-28 00:00:00 | 2018-10-19 01:44:43 | tbs | mlb baseball | entertainment | 35865299 |
| 2 | IgUs7l8apkJ98 | 2018-10-28 00:00:00 | 2018-10-19 01:31:11 | tbs | mlb baseball | entertainment | 35865299 |
| 3 | IgUs7l8apkJ98 | 2018-10-28 00:00:00 | 2018-10-01 00:09:36 | cbs | 60 minutes | locals | 35089227 |

| | DMA | week_start | week_end | media | network | Impressions |
|---|---|---|---|---|---|---|
| 1 | Atlanta | 2018-10-14 | 2018-10-20 | TV | nbc | 324310 |
| 2 | Phoenix | 2018-10-14 | 2018-10-20 | TV | nbc | 258244 |

| | USER ID | Sales_timestamp | Exposure_timestamp | network | tactic | Conversion_attribution | baseline_conversion_probability |
|---|---|---|---|---|---|---|---|
| 1 | lgUs7l8apkJ98 | 2018-10-28 00:00:00 | 2018-10-19 01:44:43 | tbs | mlb baseball | 0.05 | 0.6 |
| 2 | lgUs7l8apkJ98 | 2018-10-28 00:00:00 | 2018-10-19 01:31:11 | tbs | mlb baseball | 0.025 | 0.6 |
| 3 | lgUs7l8apkJ98 | 2018-10-28 00:00:00 | 2018-10-17 00:00:00 | nbc | Fall campaign | 0.15 | 0.6 |
| 4 | lgUs7l8apkJ98 | 2018-10-28 00:00:00 | 2018-10-01 00:09:36 | cbs | 60 minutes | 0.175 | 0.6 |

SYSTEM AND METHOD FOR OPTIMIZING CROSS-CHANNEL MARKETING

RELATED APPLICATIONS

This claims the benefit of U.S. Provisional Patent Application No. 63/547,247, entitled "SYSTEM AND METHOD FOR OPTIMIZING CROSS-CHANNEL MARKETING," by inventors Michael Cohen, Phil Austin, Saachi Minocha, Alex Cote, and Pete Ungberg, filed 3 Nov. 2023, the disclosure of which is incorporated herein by reference in its entirety for all purposes.

BACKGROUND

Field

This disclosure is generally related to the optimization of marketing plans by rendering customer journeys across multiple media channels. Particularly, this disclosure relates to optimizing the allocation of budget, the marketing tactics, messages, and creative campaign over various media channels/markets to achieve various user-defined marketing goals.

Related Art

Modern corporations often conduct marketing campaigns to promote their product, service, or brand to a specific audience. The rapid development of digital technologies has created a profound impact on marketing. In addition to traditional media channels (e.g., print, TV, radio, billboards, etc.), marketers are now presented with a vastly diverse array of media channels to reach their target audiences, such as search engines, social media, email messages, Short Message Service (SMS) messages, paid advertising in web pages, etc. The increased media channels create both marketing opportunities and management challenges.

One key challenge can be the difficulty in measuring the effectiveness of a market campaign across multiple media channels, especially when the customer journey spans multiple channels and touchpoints. As the complexity of customer journeys multiplies, so do the gaps in data. Privacy barriers, walled gardens, and multi-device lifestyles have created a fog of fragmented data for measurement. Measurement of the return on investment (ROI) for each channel can also be difficult, meaning it may be difficult to effectively allocate the marketing budget across multiple media channels.

SUMMARY

One embodiment can provide a method and system for optimizing marketing plans. During operation, the system can collect historical customer data from a plurality of data sources, apply a machine learning technique to train a customer model based at least on the historical customer data, and obtain an initial marketing plan, which specifies a plan goal and one or more constraints. Training the customer model comprises generating synthesized customer data. The system can perform an optimization process based on the initial marketing plan and the customer model. The system can further generate and present a report based on the optimization process, the report comprising an optimized marketing plan, thereby facilitating future marketing efforts based on the optimized marketing plan.

In a variation on this embodiment, training the customer model can include performing Maximum a Posterior (MAP) estimation or a variation of Monte Carlor sampling.

In a variation on this embodiment, performing the optimization process can further include generating additional synthesized customer data using the trained customer model.

In a variation on this embodiment, the customer data can include customer behavior data associated with a plurality of media channels, and the plurality of data sources can include at least a first-party data source, a data source associated with an advertisement platform, and a third-party data source.

In a variation on this embodiment, the plan goal can include a budget goal, a conversion goal, or both; and the constraints can include one or more of a time constraint, a budget constraint, and a performance constraint associated with one or more key performance indicators (KPIs).

In a variation on this embodiment, obtaining the initial marketing plan comprises presenting a scenario-planning user interface (UI) to allow a user to input the plan goal and the constraints.

In a further variation, the scenario-planning UI can include a category-selection drop-down menu to allow the user to select a planning category from a plurality of planning categories.

In a further variation, the plurality of planning categories comprise one or more of: media type, media market, advertisement platform, media channel, tactic, and country.

In a further variation, the scenario-planning UI can include a plan detail UI element to allow the user to edit the initial marketing plan by adjusting budget allocation across a plurality of subcategories associated with the selected planning category.

In a further variation, the optimized marketing plan can include a re-allocation of the budget across the plurality of subcategories, and the report can include a performance comparison between the optimized marketing plan and the initial marketing plan.

BRIEF DESCRIPTION OF THE FIGURES

FIG. 3A illustrates exemplary customer data at the individual user level, according to one embodiment of the instant application.

FIG. 3B illustrates exemplary aggregated customer data, according to one embodiment of the instant application.

In the figures, like reference numerals refer to the same figure elements.

DETAILED DESCRIPTION

Figure 1:
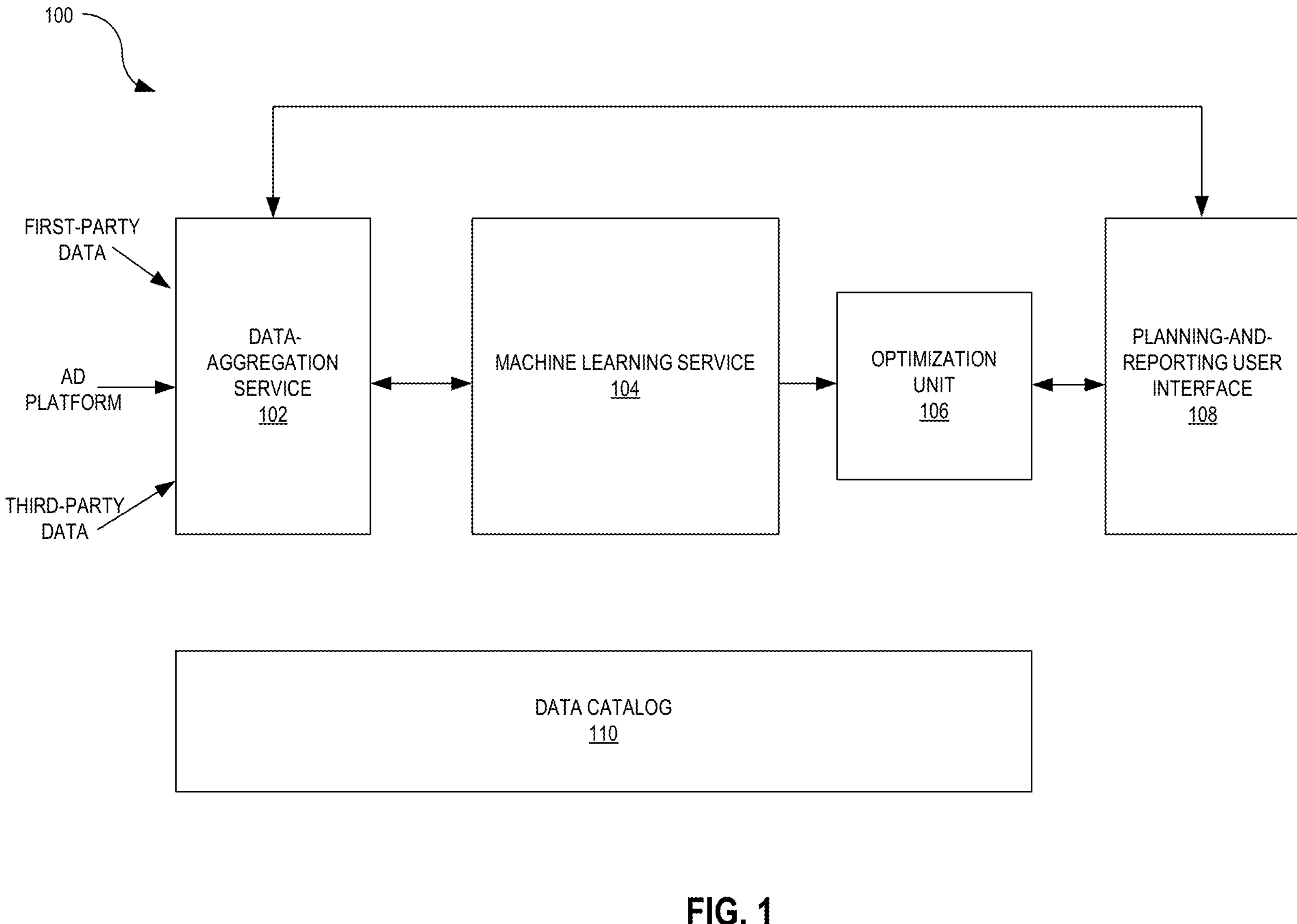
FIG. 1 illustrates an exemplary architecture of the all-channel marketing-optimization platform, according to one embodiment of the instant application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of improving the performance of marketing plans. More specifically, an all-channel marketing-optimization platform can be provided to allow a user to create and optimize marketing plans that span multiple media channels. The all-channel marketing-optimization platform can collect vast amounts of historical customer data from various data sources and use the collected customer data to train machine learning models to predict customer behaviors and conversion attributions. In addition to collecting historical data, the all-channel marketing-optimization platform can also generate synthesized customer data when there is a gap in data collection (e.g., due to privacy policies). The platform can perform optimization based on user-defined plan goals and constraints. More specifically, the platform can recommend re-allocation of budget across a number of user-selected subcategories (e.g., different types of media or different media markets) to improve the performance (e.g., to increase conversions or decrease spending) of the marketing plan.

All-Channel Marketing Optimization

Conventional marketing modeling techniques (e.g., media mixing modeling) have many shortcomings. For example, they are often static and retrospective, with an annualized view of the market, and can require years of data. They have limited actionability and can only provide channel-level insights. Existing models may over-rely on digital channels and overemphasize last touchpoints. To make the data usable, existing models often depend on identifiers and other systems.

In contrast, the present disclosure provides a novel marketing-optimization platform that can provide a continuous model with near real-time visibility and accounts for market factors. The platform can provide users with actionable recommendations with a path to activation and can be forward-looking. While developing the model, the system can account for all media channels. While determining the attribution, the system considers all touchpoints, including those with long-tail impact. The platform can collect vast amounts of customer data through ingestion and fill in gaps (e.g., through data synthesizing) where needed. The platform can provide optimal marketing strategies based on various goals set by the client, such as optimizing the allocation of budgeting resources among multiple media channels.

FIG. 1 illustrates an exemplary architecture of the all-channel marketing-optimization platform, according to one embodiment of the instant application. All-channel marketing-optimization platform 100 includes a data-aggregation service 102, a machine learning service 104, an optimization unit 106, and a planning-and-reporting user interface 108.

Data-aggregation service 102 can be responsible for ingesting and aggregating customer data associated with a client (e.g., an organization or company) from a plurality of data sources, including data directly provided by the client and data collected from advertisement platforms.

In today's complex digital environment, typical customer journeys may span multiple channels and touchpoints. In one example, a customer may become aware of a product or service via a first touchpoint (e.g., a TV advertisement) and enter a consideration stage via a second touchpoint (e.g., web searches). A third touchpoint (e.g., a coupon sent via email) may trigger the customer to make a purchase decision, and the customer may reach the conversion stage by purchasing the product via an online portal or at a physical retail store. In another example, a customer may become aware of a product by reading a post from an online influencer and then purchase the product via a link provided by the influencer's website. Understanding the customer's journey to conversion is crucial for creating effective marketing strategies. Because different customers may take different journeys to reach conversion, and each customer journey may involve multiple media channels, data-aggregation service 102 has been designed such that it can aggregate large amounts of customer data from many different data sources.

In some embodiments, data-aggregation service 102 can obtain customer data from one or more first-party real-time data sources associated with the client, such as a customer relationship management (CRM) system and a customer data platform (CDP). Data-aggregation service 102 can also obtain customer data from existing digital advertisement platforms, such as a DoubleClick Campaign Manager (DCM), social media platforms (e.g., Facebook, Instagram, etc.), connected TV (CTV), etc. In some embodiments, data-aggregation service 102 can be configured to establish data-acquisition links to those existing digital advertisement platforms using credentials provided by the client. For example, when a client establishes an account with all-channel marketing-optimization platform 100, the client can provide their existing credentials for accessing a number of digital advertisement platforms to allow data-aggregation service 102 to connect to those digital advertisement platforms directly to obtain the customer data. Data-aggregation service 102 can also obtain customer data from one or more third-party data providers, such as those providing geodemographic data. In addition to the data sources known to the client, in some embodiments, based on the practical scenarios, data-aggregation service 102 may also suggest new data sources to the client. For example, data-aggregation service 102 may prompt the client to purchase customer data from Google.

Data-aggregation service 102 can ingest customer data from the aforementioned multiple data sources and create a data catalog 110, which can serve as a central metadata repository. In some embodiments, while ingesting customer data from various data sources, data-aggregation service 102 can perform the Extract, Transfer, Load (ETL) process. Moreover, data cleaning and normalization can also be performed. The normalized data can be suitable for machine learning tasks.

Machine learning service 104 can use machine learning techniques (e.g., implementing generative models) to predict customer behaviors and determine the attribution of various touchpoints. Outputs of the machine learning models can also be used to run marketing experiments (e.g., by building virtual or tokenized audiences and measuring the effectiveness of marketing campaigns).

In some embodiments, machine learning service 104 can use machine learning models (e.g., generative models) to estimate media communication exposure rates and their impact on marketing Key Performance Indicators (KPIs). More specifically, a utility model can be implemented to estimate the indirect utility of KPI conversions (i.e., the likelihood of a top-2-box rating) on the basis of cumulative media exposures, fixed effects, a systematic demand shock, and an independent and identically distributed (i.i.d.) random shock. Examples of marketing KPIs can include conversion rate, cost per thousand impressions (CPM), return on investment (ROI), etc.

Assuming for each market m, m=1, 2, . . . , M, there is a different sample of customers i, i=1, 2, . . . , N, that decides whether to give a top-2-box rating to a particular KPI based upon their exposure to media (attributes) k, k=1, 2, . . . , K. According to the utility model, the indirect utility for each of the j, j=1, 2, . . . , J KPIs under consideration can be expressed as:

$$U_{im}^{j} = V_{im}^{j} + \varepsilon_{im}^{j} = \alpha_{im}' x_{im} + \eta_m + \varepsilon_{im}^{j}, \quad (1)$$

where $\alpha_{im}$ is a vector of coefficients that give the impact of the media exposure on customer i in market m, $x_{im}$ is a vector of media exposure, $\eta_m$ is a vector of fixed effects (e.g., geodemographic characteristics), and $$\varepsilon_{im}^{j}$$

is an individual specific demand shock for the $i_{th}$ customer in market m. Note that $x_{im}$ follows a Poisson distribution, and $$\varepsilon_{im}^{j}$$

can be assumed to be i.i.d.

In some embodiments, Maximum a Posterior (MAP) estimation can be used to optimize the model parameters $\alpha$ for a set of given customer data. Moreover, variations of the Monte Carlo sampling methods (e.g., direct sampling, importance sampling, rejection sampling, etc.) can be used for estimation of the posterior distribution. The MAP estimation can be performed using a two-step sequence of the BFGS (Broyden-Fletcher-Goldfarb-Shannon) and L-BFGS algorithms. In some cases, individual-level exposure data can be available in addition to aggregated data. However, in certain cases, the customer data may only be available at the aggregated level (i.e., media exposures and KPI incidences are available at the aggregated market level). In such cases, machine learning service 104 can use a machine learning model to augment the customer data. For example, a customer model can use the aggregated exposure data to simulate channel exposure counts and customer response for each customer in each market.

In addition to simulating the customer response, machine learning service 104 can further simulate the effects of a plurality of touchpoints (e.g., media channels). In one embodiment, machine learning service 104 can implement a touchpoint-simulation model to simulate the effect of a touchpoint based on the ground truth media data and the simulated customer data. Machine learning service 104 can predict the marketing attribution based on both the simulated customer data and the simulated touchpoint data.

Figure 2:
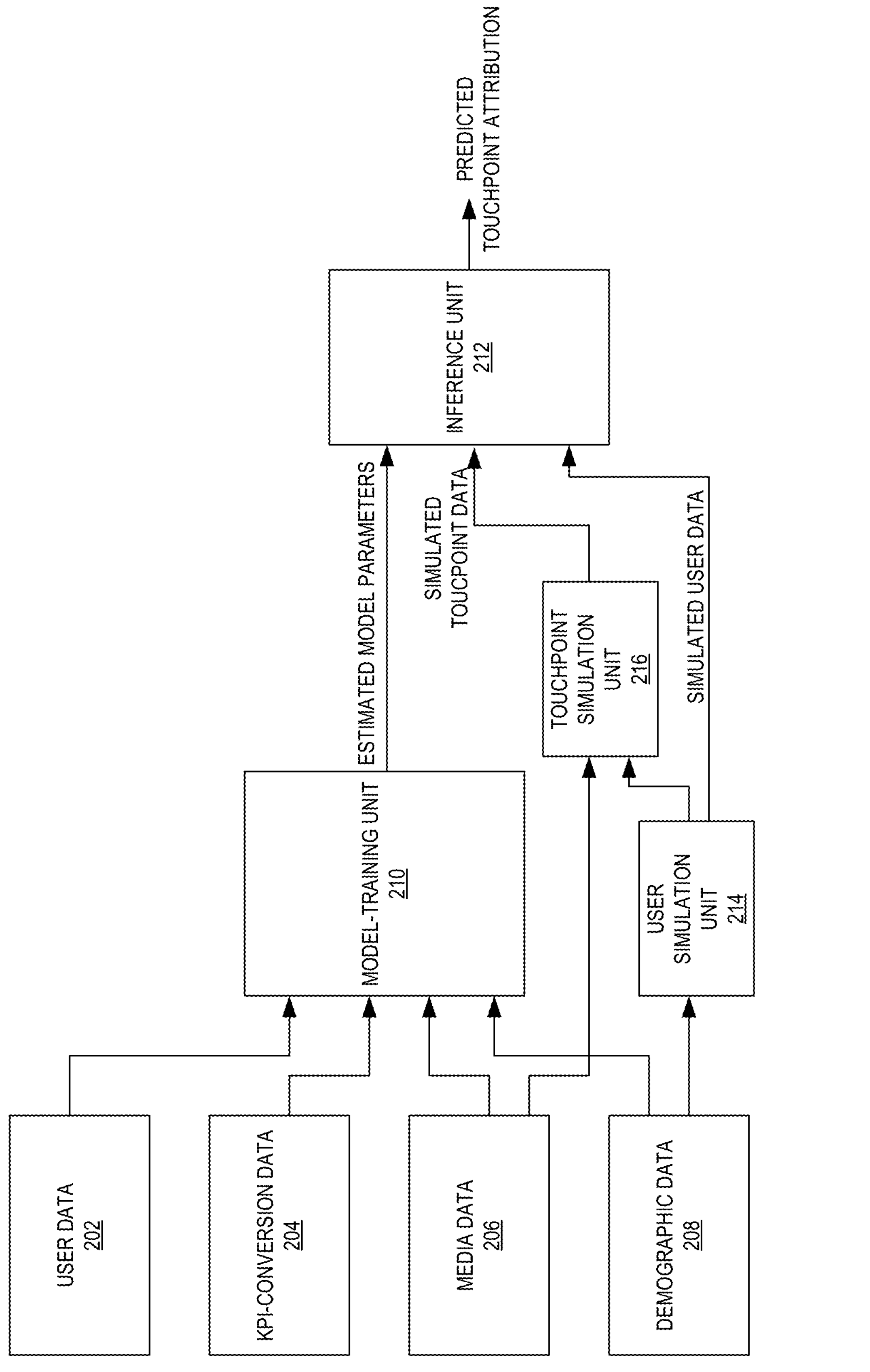
FIG. 2 illustrates an exemplary architecture of a machine learning model for predicting marketing attribution, according to one embodiment of the instant application.

FIG. 2 illustrates an exemplary architecture of a machine learning model for predicting marketing attribution, according to one embodiment of the instant application. In the example shown in FIG. 2, user data 202, KPI-conversion data 204, media data 206, and demographic data 208 can be sent to model-training unit 210 to train a customer model. More specifically, user data 202 can include an aggregation of historical data associated with the users' behavior, the estimated user response to media exposures, and the estimated KPI-conversion data. The customer model can also be referred to as a customer-treatment-and-behavior model because it models both the customer behaviors (e.g., exposure and response) and treatment (e.g., communication touchpoints).

Demographic data 208 can be sent to user simulation unit 214 that can generate simulated user data. The simulated user data can include the simulated user response to media exposures. In addition, the simulated user data and the media data 206 can be sent to a touchpoint simulation unit 216 that can generate simulated touchpoint data.

Model-training unit 210 can output the estimated model parameters of the customer model. Although not shown in the drawing, model-training unit 210 can be embedded with a user simulation unit (which can be similar to user simulation unit 214) and a touchpoint simulation unit (which can be similar to touchpoint simulation unit 216). During the training of the customer model, user simulation unit 214 and touchpoint simulation unit 216 can generate synthesized user and touchpoint data. This generative data-augmentation process can enrich and synthesize the desired data to render consumer journeys where that data is not an initial input into the training process. The estimated model parameters can be loaded into inference unit 212, which can use the trained customer model and the simulated user and touchpoint data as model input to generate a prediction output regarding the touchpoint attribution. In one example, the trained customer model can be used to compute incremental/marginal attribution (the difference in stimuli (i.e., conversion) with and without the treatment (i.e., a communication touchpoint)).

FIG. 3A illustrates exemplary customer data at the individual user level, according to one embodiment of the instant application. In this example, the media channel can be conventional TV (e.g., broadcast TV), and Table 300 shows the exposure time and the conversion time of individual users. FIG. 3B illustrates exemplary aggregated customer data, according to one embodiment of the instant application. Table 310 shows the count of impressions (e.g., the number of opportunities people view the AD) in different Designated Market Areas (DMAs), such as Atlanta and Phoenix.

Figure 3C:
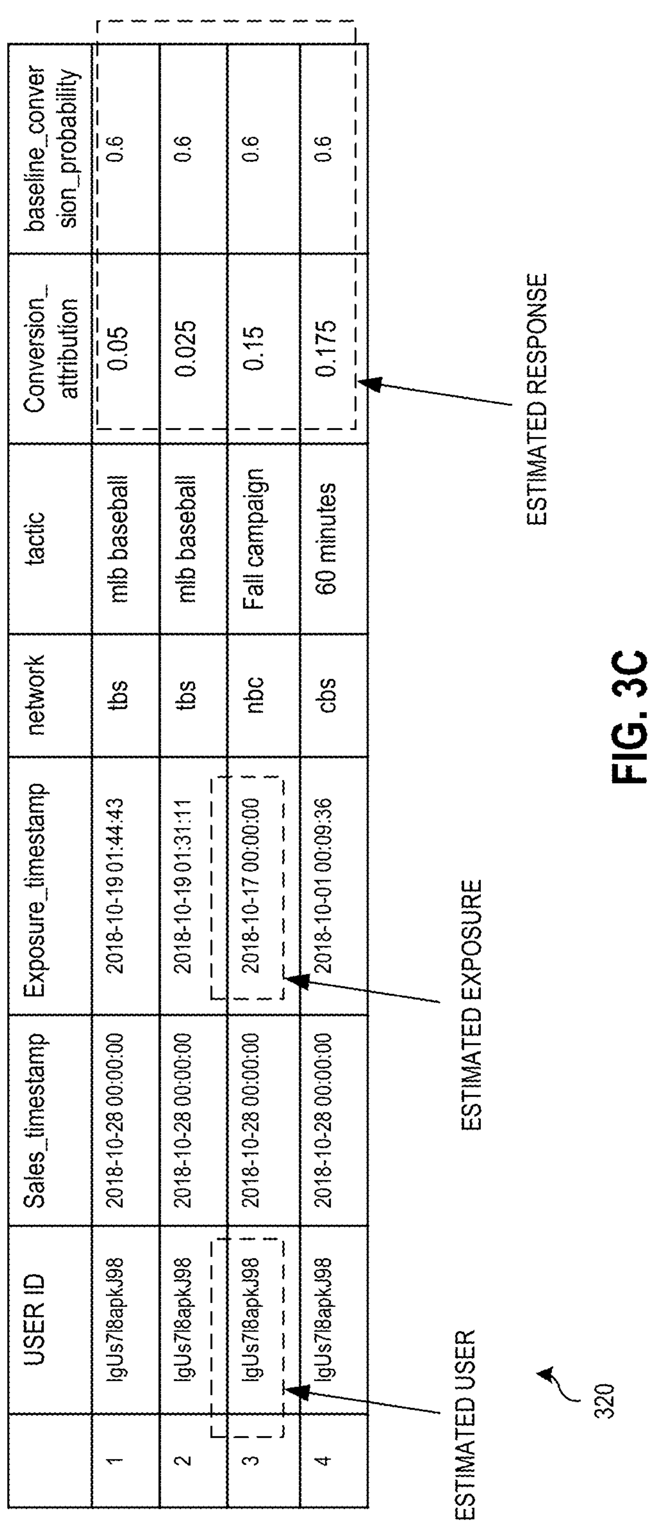
FIG. 3C illustrates an exemplary output of the customer model, according to one embodiment of the instant application.

FIG. 3C illustrates an exemplary output of the customer model, according to one embodiment of the instant application. More specifically, the customer model can use the individual-level customer data and the aggregated customer data to simulate customer behaviors. The $3^{rd}$ row of Table 320 corresponds to the estimated user behavior, such as the estimated (or simulated) exposure. The customer model can predict the marketing attribution (e.g., the conversion attribution of each media channel) based on both the actual user behavior data and the simulated user behavior data.

Returning to FIG. 1, the prediction output of machine learning service 104 can be used by optimization unit 106 as parameters for solving a multivariate optimization problem with constraints. One example of the multivariate optimization problem can be finding the optimized budget allocation to maximize the performance of one or more KPIs (e.g., sales or exposure) given a budget constraint. In this example, the objective function of the multivariate optimization problem can be maximizing the KPI performance $$\text{(e.g., } \max_s N \sum_{i \in U} \omega_i \mathbb{E}_P f(x(F_i)) \text{), where } f(x(F_i))$$

is the customer response function to media exposures. The constraints can include the minimum and maximum spending for each channel (e.g., $c_L \le s \le c_H$), the media exposure or impressions of each channel $$\text{(e.g., } \lambda_{ik} = h_{ik}\left(\frac{s_k}{c_k}\right)\text{),}$$

and the total budget $$\left(\text{e.g., } B = \sum_k s_k\right).$$

Another example of the multivariate optimization problem can be finding the optimized budget allocation to minimize the total spending while achieving a set of KPI goals. In this example, the objective function of the multivariate optimization problem can be minimizing the total budget $$\left(\text{e.g., } \min_s \sum_k s_k\right),$$

and the constraints can include the spending constraint for each channel (e.g., $c_L \le S \le c_H$), the media exposure or impressions of each channel $$\left(\text{e.g., } \lambda_{ik} = h_{ik}\left(\frac{s_k}{c_k}\right)\right),$$

and the predetermined minimum KPI performance $$\left(\text{e.g., } N \sum_{i \in U} \omega_i \mathbb{E}_P f(x(F_i)) \ge G\right).$$

Planning-and-reporting user interface 108 can include one or more graphic user interfaces (GUIs), such as a scenario-planning GUI and an optimization-result-reporting GUI. The scenario-planning GUI allows a user to define the optimization problem by setting the objective (e.g., the KPI targets) and entering constraints (e.g., the DMAs, the time horizon, the total budget, etc.). The scenario-planning GUI can also allow the user to create an initial plan. For example, the user may select multiple media channels for an upcoming ad campaign and specify an initial budget allocation for each media channel.

The user inputs can be sent to optimization unit 106 and used as the initial conditions of the multivariate optimization problem. The optimization result can be displayed in the optimization-result-reporting GUI. For example, the optimization-result-reporting GUI can display a recommended marketing plan, including the budget allocation for each media channel. More specifically, the optimization-result-reporting GUI can show a side-by-side performance comparison between the initial and recommended plans. For example, the optimization-result-reporting GUI can compare the conversion count and the money allocation for each media channel of the initial plan against those of the recommended plan. The optimization-result-reporting GUI can also show the improvement (e.g., in percentage) in the performance of the recommended plan over the initial plan.

Figure 4A:
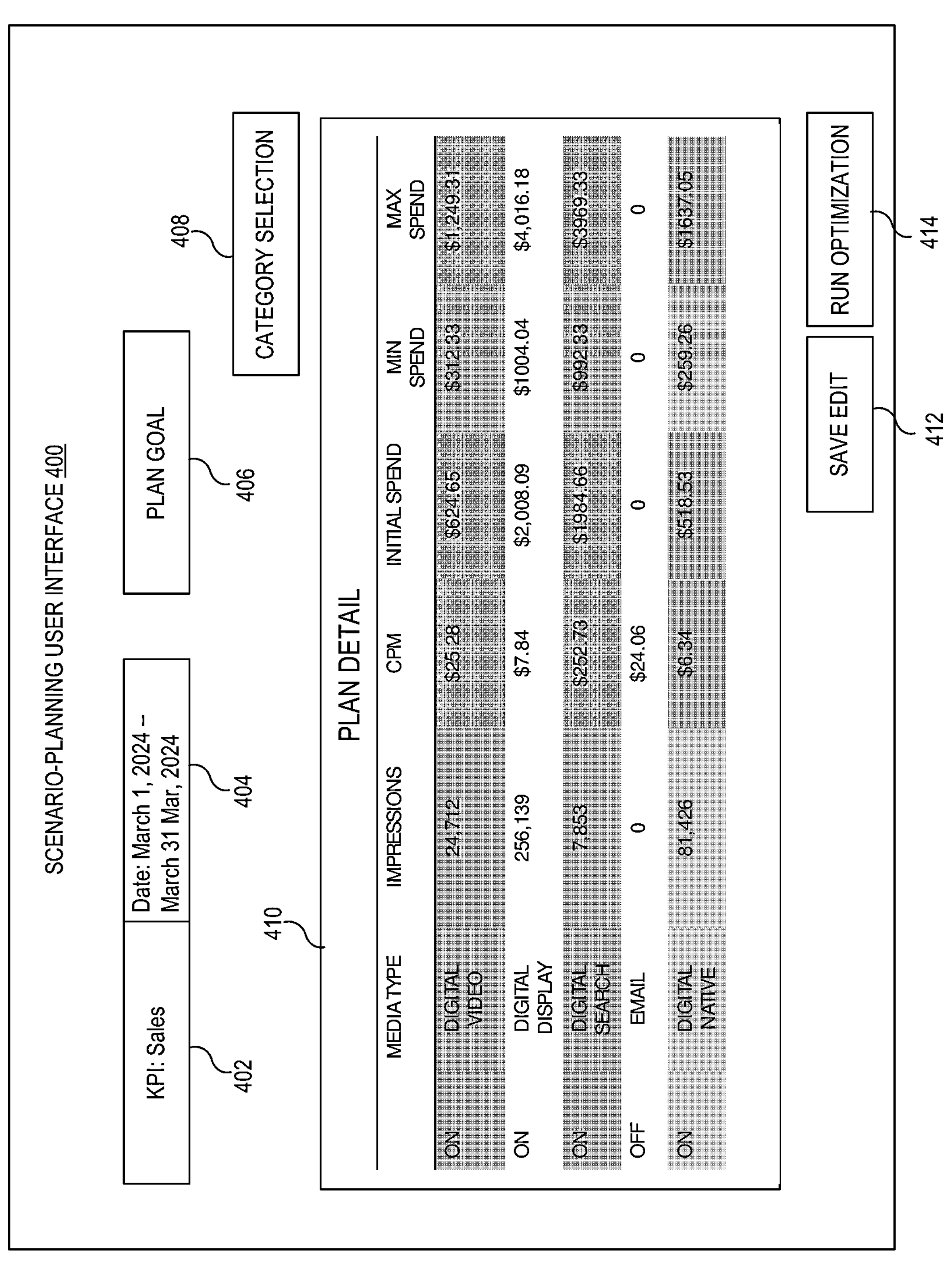
FIG. 4A illustrates an exemplary scenario-planning user interface, according to one embodiment of the instant application.

FIG. 4A illustrates an exemplary scenario-planning user interface, according to one embodiment of the instant application. In FIG. 4A, scenario-planning user interface (UI) 400 can include a plurality of UI elements, such as a KPI element 402, a time-horizon element 404, a plan-goal element 406, a category-selection element 408, a plan-detail element 410, a save-edit button 412, and a run-optimization button 414.

KPI element 402 can allow the user to select a KPI from a plurality of marketing KPIs, including but not limited to: consideration, sales, search clicks, web activities, etc. In one embodiment, KPI item 402 can include a dropdown menu, and the user can click on one or more menu items to specify one or more KPIs. The effectiveness of the marketing plan can be measured with respect to the specified KPIs. For example, a user may select "sales" as the KPI, meaning that a conversion is achieved when the customer makes a purchase. In another example, if the selected KPI is "search clicks," a conversion is achieved when the customer performs a search click. The user may also select both the "sales" KPI and the "search clicks" KPI. When multiple KPIs are selected, a second menu item can appear, prompting the user to select a weight factor (e.g., in percentage) for each KPI. The total weight of the multiple KPIs should be 100%.

Time-horizon element 404 can allow the user to specify the starting and ending time of the marketing plan. In one embodiment, an interactive calendar can be displayed when the user clicks on time-horizon element 404 to select the starting and ending dates.

Plan-goal element 406 can allow the user to specify a plan goal, which can include a budget goal, a conversion goal, or both. In one embodiment, when the user selects a budget goal, an empty field next to plan-goal element 406 can be displayed, prompting the user to enter a dollar amount as the total budget for the marketing plan. In one more embodiment, when selecting a conversion goal, the user can specify a minimum number of conversions.

Category-selection element 408 can allow the user to select a planning category (i.e., making the marketing plan with respect to a particular category). Examples of the planning categories can include but are not limited to media type (e.g., connected TV, digital video, digital display, email, etc.), media market, platform (e.g., social media sites like Facebook, Twitter, etc.), advertisement vehicle (e.g., different media channels such as TV, radio, print media, websites, social media, search engine, etc.), tactic (e.g., content marketing, social media marketing, search engine optimization, influencer marketing, etc.), country, etc. For example, if the user selects "media type" as the planning category, the marketing plan can involve allocating budget across different media types; if the user selects "country" as the planning category, the marketing plan can involve allocating budget across different countries.

Plan-detail element 410 can include an interactive table that allows the user to define an initial plan or edit an existing plan based on the plan goal. In the example shown in FIG. 4A, the selected category can be "media type," and the interactive table can include a plurality of rows, with each row corresponding to a particular subcategory (i.e., a type of media). Each row can also include an on-off toggle field to allow the user to turn on or off the corresponding type of media. When turned off, the corresponding type of media (e.g., email) is not included in the marketing plan.

The interactive table can also include a plurality of columns to display data associated with each subcategory. In some embodiments, such data can be obtained by data-aggregation service 102 shown in FIG. 1. Such data can include historical customer data associated with the client. For example, once a planning category is selected, customer data can be obtained and organized according to the selected category. In an alternative example, the user may upload an existing plan (e.g., in the form of an XML file), and details of the uploaded plan can be displayed by plan-detail element 410.

In some embodiments, in addition to turning on or off a selected row or subcategory, the user can also edit one or more fields of the displayed plan details. In the example shown in FIG. 4A, the user may update the spending for each media type, including the initial spending, the minimum spending, and the maximum spending. Note that the CPM is not controlled by the user, and the value in the impressions field is associated with the CPM and the initial spending.

Upon the completion of editing the various fields of plan-detail element 410, the user can click save-edit button 412 to save the current plan. The user can further click run-optimization button 414 to trigger the system to perform an optimization operation to generate an optimized plan based on the current plan.

Figure 4B:
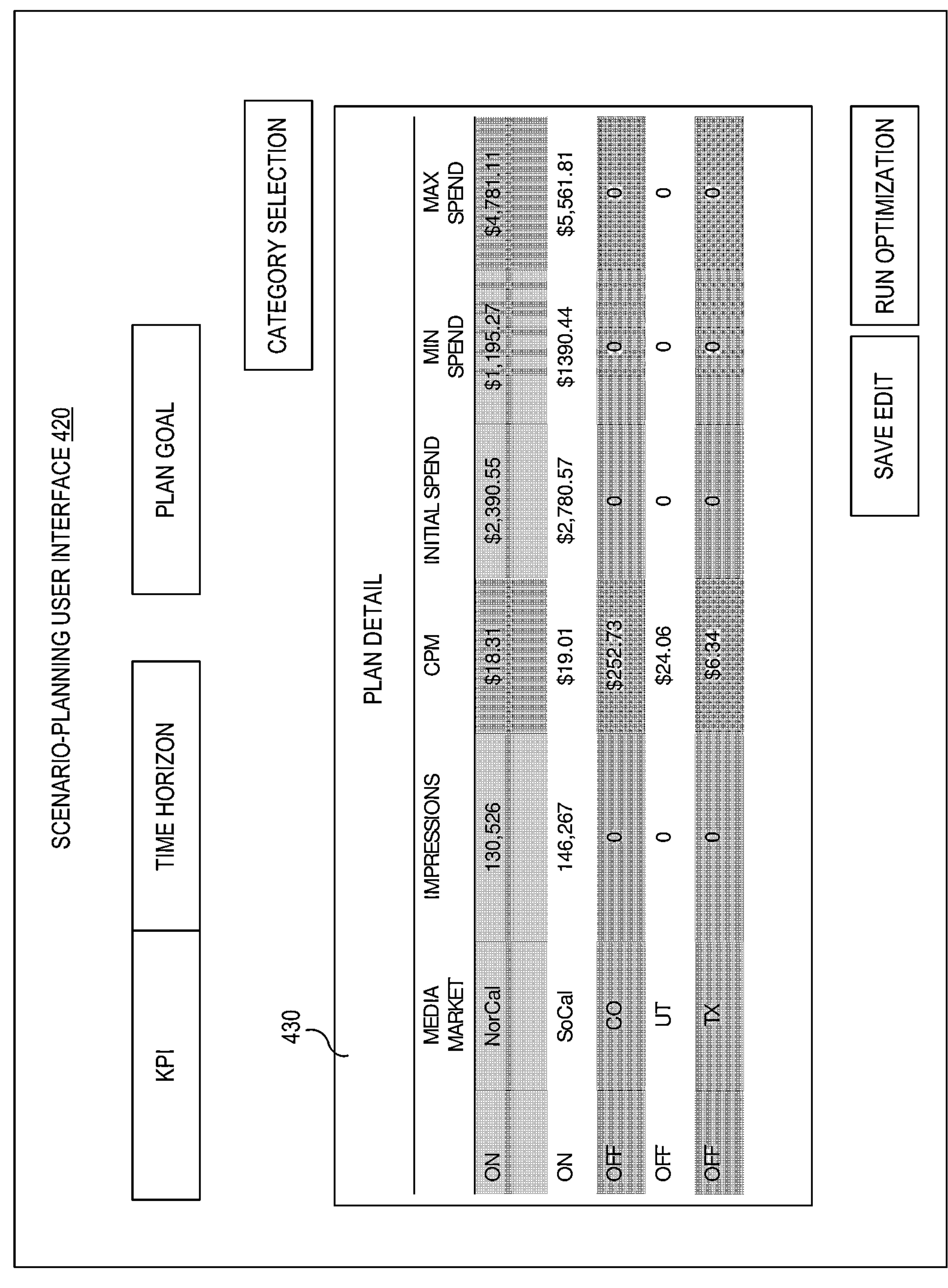
FIG. 4B illustrates an exemplary scenario-planning user interface, according to one embodiment of the instant application.

FIG. 4B illustrates an exemplary scenario-planning user interface, according to one embodiment of the instant application. In FIG. 4B, scenario-planning user interface 420 can be similar to scenario-planning user interface 410 displayed in FIG. 4A. In the example shown in FIG. 4B, the user has selected "media market" as the planning category. Accordingly, plan-detail element 410 displays a plan that involves allocating the budget across multiple media markets, such as northern California (NorCal) and southern California (SoCal).

In the examples shown in FIGS. 4A-4B, the scenario-planning UI is shown as a single page. In practice, the UI may include multiple pages. For example, the UI can include a separate user input page to allow a user to input KPI selections, enter the time horizon information, and define the plan goal.

The various user inputs (e.g., the selected KPI, the time horizon, the budget or conversion goal, the planning category, the minimum and maximum spending, etc.) may be used (e.g., by optimization unit 106 shown in FIG. 1) as model parameters and constraints for running the multivariate optimization. For example, if the plan goal is a predetermined budget amount, the objective function of the multivariate optimization can be maximizing the conversions, and the constraints can include the total budget; if the plan goal is a predetermined number of conversions, the objective function of the multivariate optimization can be minimizing the total budget.

Once the user clicks the run-optimization button (e.g., button 414 shown in FIG. 4A), the system can perform the multivariate optimization operation to determine an optimized plan (e.g., the re-allocation of the budget according to the selected planning category). In some embodiments, while performing the multivariate optimization, the system may rely on the attribution predicted by machine learning models to determine conversions corresponding to the selected planning category. In one example, the selected planning category is "media type." Accordingly, the system may determine the number of conversions corresponding to each media type based on the predicted attribution. Moreover, the result of the multivariate optimization can include the optimized budget allocation across the multiple types of media selected by the user. In one more example, the selected planning category is "media market." Accordingly, the system may determine the number of conversions corresponding to each media market based on the predicted attribution. Moreover, the result of the multivariate optimization can include the optimized budget allocation across the multiple media markets selected by the user. The optimization result can be displayed in an optimization-result-reporting GUI.

Figure 5:
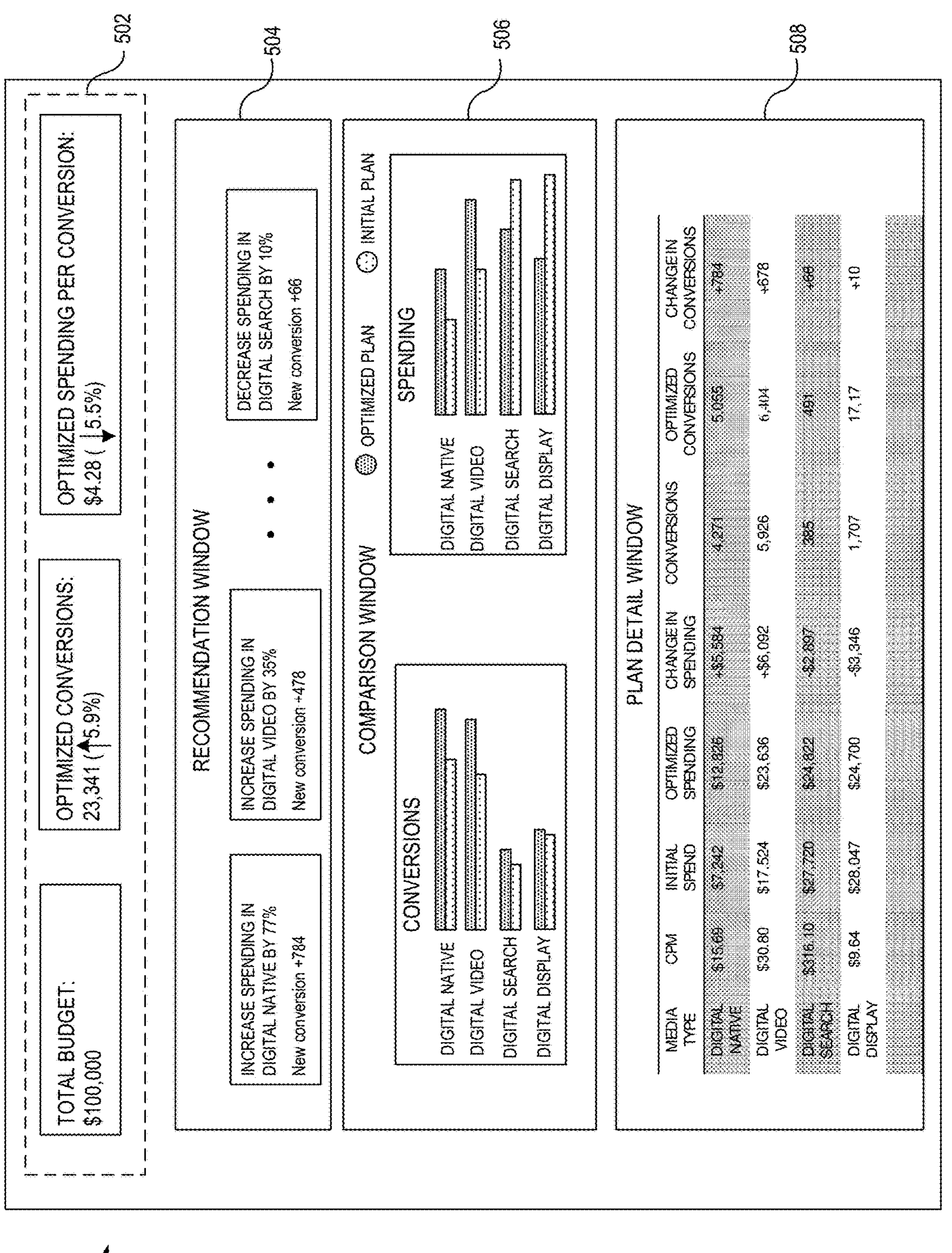
FIG. 5 illustrates an exemplary reporting user interface, according to one embodiment of the present application.

FIG. 5 illustrates an exemplary reporting user interface, according to one embodiment of the present application. In the example shown in FIG. 5, reporting UI 500 can include an optimization summary region 502, a recommendation window 504, a comparison window 506, and a plan detail window 508.

Optimization summary region 502 can be configured to display a summary of the overall performance of the optimized plan. In this example, the plan goal can be a budget goal, and information displayed in optimization summary region 502 can include the total budget, the number of the predicted conversions of the optimized plan, and the predicted spending per conversion of the optimized plan. In addition to the absolute values, the predicted improvement (e.g., in percentage) of the conversions and the cost per conversion of the optimized plan over the initial or existing plan may also be displayed in optimization summary region 502. In some embodiments, information displayed in optimization summary region 502 can be user configurable. For example, the user may configure optimization summary region 502 to display only one of the optimized conversions and the optimized cost per conversion.

Recommendation window 504 can be configured to display one or more key recommendations for adjusting the initial or existing marketing plan. In this example, the planning category for the optimization is "media type." Accordingly, the recommendations can include the re-allocation of the budget across the different user-selected media types (e.g., increasing the spending on one media type and decreasing the spending on another media type). In some embodiments, recommendation window 504 can display a predetermined number of most impactful recommendations. In one example, recommendations that can significantly increase the number of predicted conversions can be displayed in recommendation window 504. In another example, recommendations that can significantly modify the spending on certain media types can be displayed in recommendation window 504.

Comparison window 506 can be configured to display the side-by-side comparison between the optimized plan and the initial (or existing) plan. In the example shown in FIG. 5, comparison window 506 can display, for a number of media types, the comparisons of the number of conversions and spending between the optimized plan and the initial (or existing) plan. In the example shown in FIG. 5, compared with the initial plan, the optimized plan can result in an increased number of conversions for all media types. In addition, the optimized plan may re-allocate the budget, such as increasing spending in certain media types (e.g., digital native and digital video) and decreasing spending in other media types (e.g., digital search and digital display). Information displayed in comparison window 506 can also be user configurable. In some embodiments, the comparisons are made according to the recommendations displayed in recommendation window 504.

Plan detail window 508 can be configured to display detailed information regarding the optimized plan, including adjustment made to each subcategory of the initial plan and the improvement. In this example, plan detail window 508 can display, for each media type, the optimized spending and number of conversions. For simplicity of illustration, plan detail window 508 only includes information associated with a few media types. In most practical scenarios, for each planning category, a marketing plan may include many subcategories. For example, for the media market category, the number of subcategories (i.e., the number of media markets) can be a few hundred. Plan detail window 508 can be configured to display detailed spending and conversion information for each and every subcategory.

Figure 6:
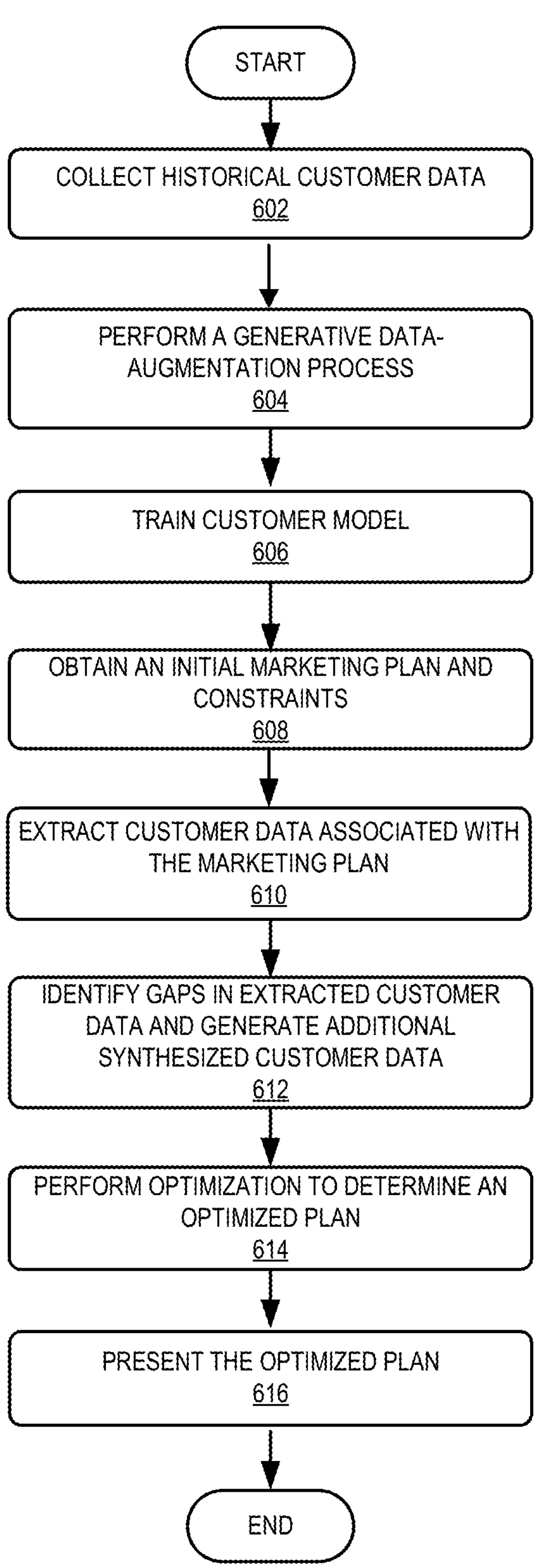
FIG. 6 presents a flowchart illustrating an exemplary process for optimizing a marketing plan, according to one embodiment of the present application.

FIG. 6 presents a flowchart illustrating an exemplary process for optimizing a marketing plan, according to one embodiment of the present application. During operation, the system can collect historical customer data (operation 602). The customer data can include first-party data, data provided by various marketing platforms, and third-party data. The customer data can include both the individual-level customer data and the aggregated customer data. Customer data can be associated with a product, a service, or a brand. In some embodiments, raw customer data can go through an ETL pipeline to be cleaned and normalized. The system can perform a generative data-augmentation process based on the normalized customer data (operation 604). Synthesized customer data can be generated during the data-augmentation process. The collected and synthesized customer data can be stored in a unified data repository, and a data catalog can be used to organize the customer data. A combination of the collected and synthesized customer data can be used to train the customer model (operation 606). Note that, although shown as two separate operations, the data-augmentation process and the model training process are performed in an iterative manner, where more customer data can be synthesized and used during the model training process. The trained customer model can be used to predict the attribution of different media channels or types of media used in marketing campaigns. In one example, the trained customer model can be used to compute incremental/marginal attribution (the difference in stimuli (i.e., conversion) with and without the treatment (i.e., a communication touchpoint)). In some embodiments, the customer model can include a deep-learning neural network. In further embodiments, training the customer model can involve computing the maximum a posteriori (MAP) fit to the customer data using a machine learning platform, such as Tensor Flow. The training can also include performing a variation of the Monte Carlo sampling to estimate the posterior distribution.

The system can obtain (e.g., from a user via a GUI) an initial marketing plan with a plan goal and constraints (operation 608). In one example, the user can use a scenario-planning UI similar to the one shown in FIG. 4A to define an initial marketing plan, including the KPI used to measure conversions (e.g., sales or search clicks), the time horizon for implementing the plan, and the planning category. The user may also use the scenario-planning UI to enter the plan goal (e.g., a budget goal, a conversion goal, or both) and constraints (e.g., the total budget or minimum conversions).

The system can extract, from the customer data repository, customer data associated with the initial marketing plan (operation 610). The customer data may be organized based on the planning category specified by the user. For example, aggregated customer responses to marketing campaigns may be measured based on the media type or media market, depending on the planning category.

The system can identify gaps in the extracted customer data and, when needed, generate additional synthesized customer data to fill the gaps (operation 612). For example, certain customer search data may not be available due to privacy protection policies. In such situations, the system may simulate customer search behaviors based on known customer data such as geodemographic data. In some embodiments, the synthesized customer data can be generated based on the customer model. The system can then determine an optimized plan based on the initial market plan and constraints (operation 614). In some embodiments, determining the optimized plan can involve running a multivariate optimization comprising an objective and one or more constraints. The objective can be maximizing conversions or minimizing spending, and the constraints can include budget constraints and/or the minimum KPI performance constraints.

In one example, the plan goal can include a budget goal, and the planning category can be "media type." In such a scenario, solving the optimization problem can involve optimizing the budget allocation across a plurality of user-selected types of media to maximize the overall conversions given a fixed total budget. In another example, the plan goal can include a conversion goal, and the planning category can be "media type." Solving the optimization problem can involve optimizing the budget allocation across a plurality of user-selected types of media to minimize the total spending while achieving the minimum overall conversions.

Subsequent to performing the optimization, the system can present the optimization result to the user, thus facilitating the user in adjusting their initial marketing plan to improve its performance (operation 616). In some embodiments, the optimization result can be displayed in a reporting UI similar to UI 500 shown in FIG. 5. To implement the optimized plan, the user can adjust the budget allocation across the multiple use-selected subcategories according to the recommendations. The system can continue to measure the performance of the marketing plan by collecting customer data within the user-specified time horizon.

Although FIG. 6 shows a specific order of performing certain operations, the method shown in FIG. 6 is not limited to such an order. For example, operations shown in succession in the flowchart may be performed in a different order, may be executed concurrently, or with partial concurrence or combinations thereof.

Figure 7:
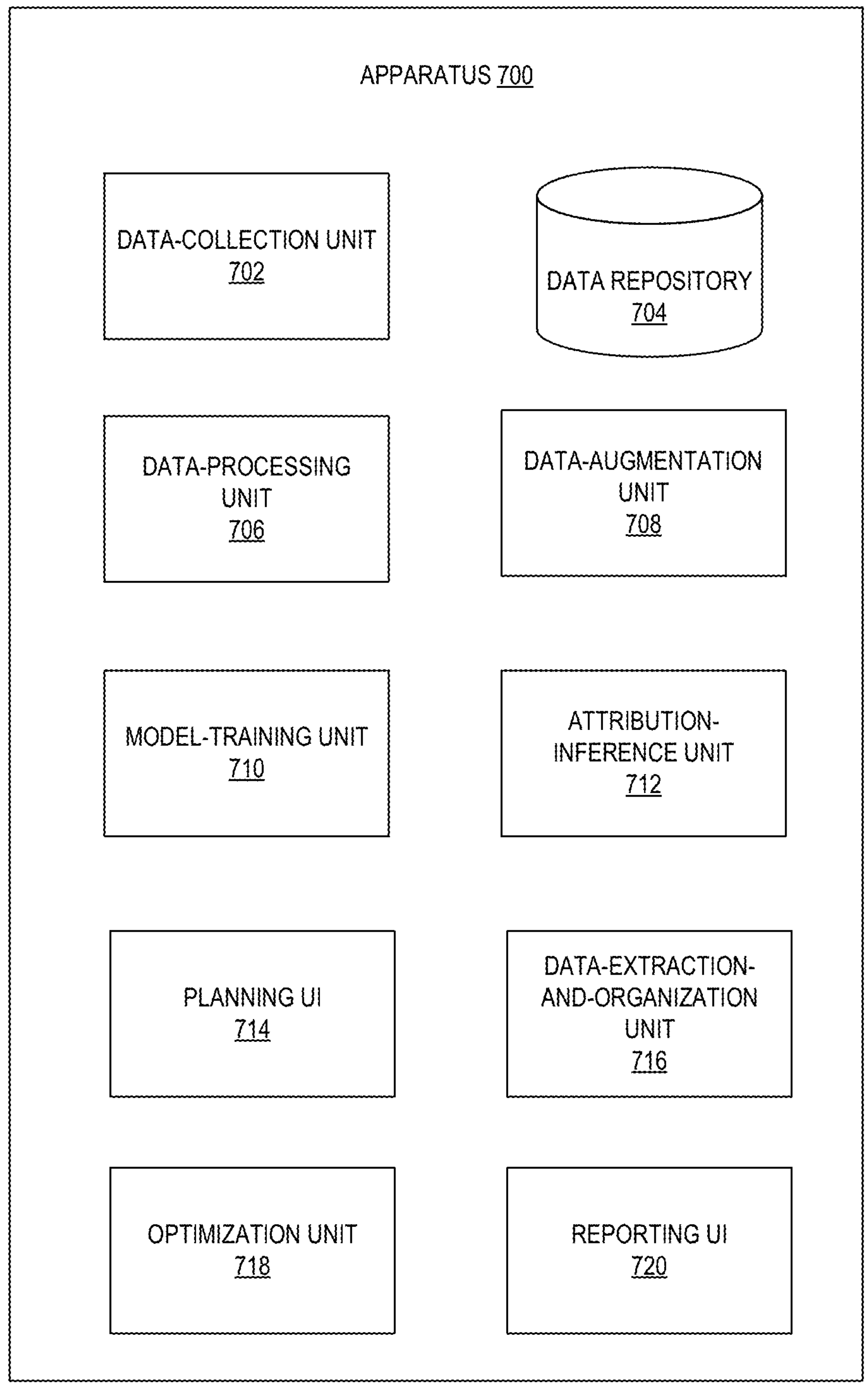
FIG. 7 illustrates the exemplary apparatus for optimizing marketing plans, according to one embodiment of the instant application.

FIG. 7 illustrates the exemplary apparatus for optimizing marketing plans, according to one embodiment of the instant application. Apparatus 700 can include a data-collection unit 702, a customer-data repository 704, a data-processing unit 706, a data-augmentation unit 708, a model training unit 710, an attribution-inference unit 712, a planning UI 714, a data-extraction-and-organization unit 716, an optimization unit 718, and a reporting UI 720. The various units in apparatus 700 may be implemented using software components, hardware components, or a combination thereof.

Data-collection unit 702 can be responsible for collecting customer data from various data sources, including but not limited to a first-party data source, a third-party data source, and one or more marketing platforms. Data repository 704 can store the collected customer data, and data-processing unit 706 can perform data cleaning and normalization operations on raw customer data to make the data suitable to machine learning applications. The processed customer data can also be stored in data repository 704.

Data-augmentation unit 708 can be responsible for synthesizing customer data based on customer data collected by data-collection unit 702. Model training unit 710 can train a machine learning-based customer model based on the collected and synthesized customer data. Attribution-inference unit 712 can be responsible for using the trained customer model to predict attribution to customer conversions among a number of media channels.

Planning UI 714 can allow a user to create a marketing plan by inputting various plan parameters, such as one or more KPIs used for measuring the conversions, a time horizon, a budget or conversion goal, the planning category, subcategories within the specified planning category, the minimum and maximum spending for each subcategory within the planning category, etc.

Data-extraction-and-organization unit 716 can extract customer data from data repository 704 based on the various plan parameters input by the user via planning UI 714. More specifically, data-extraction-and-organization unit 716 may organize (e.g., dice and slice) the customer data based on the planning category and the subcategories. In some embodiments, data-extraction-and-organization unit 716 can also determine whether the extracted customer data contains gaps (e.g., missing certain customer data due to privacy policies). If so, data-extraction-and-organization unit 716 can interact with simulation unit 710, which can then generate synthesized customer data to fill in the gaps.

Optimization unit 718 can determine an optimized plan based on the plan parameters and customer data. More specifically, optimization unit 718 can determine an objective function and one or more constraints of a multivariate optimization problem and then solve the optimization problem based on the plan parameters and customer data. The optimization result (i.e., the optimized plan) can be displayed in reporting UI 720. In some embodiments, the optimization result can include the re-allocation of the budget across multiple subcategories associated with a planning category. For example, the optimization result can include the budget re-allocation across multiple media types or media markets.

Figure 8:
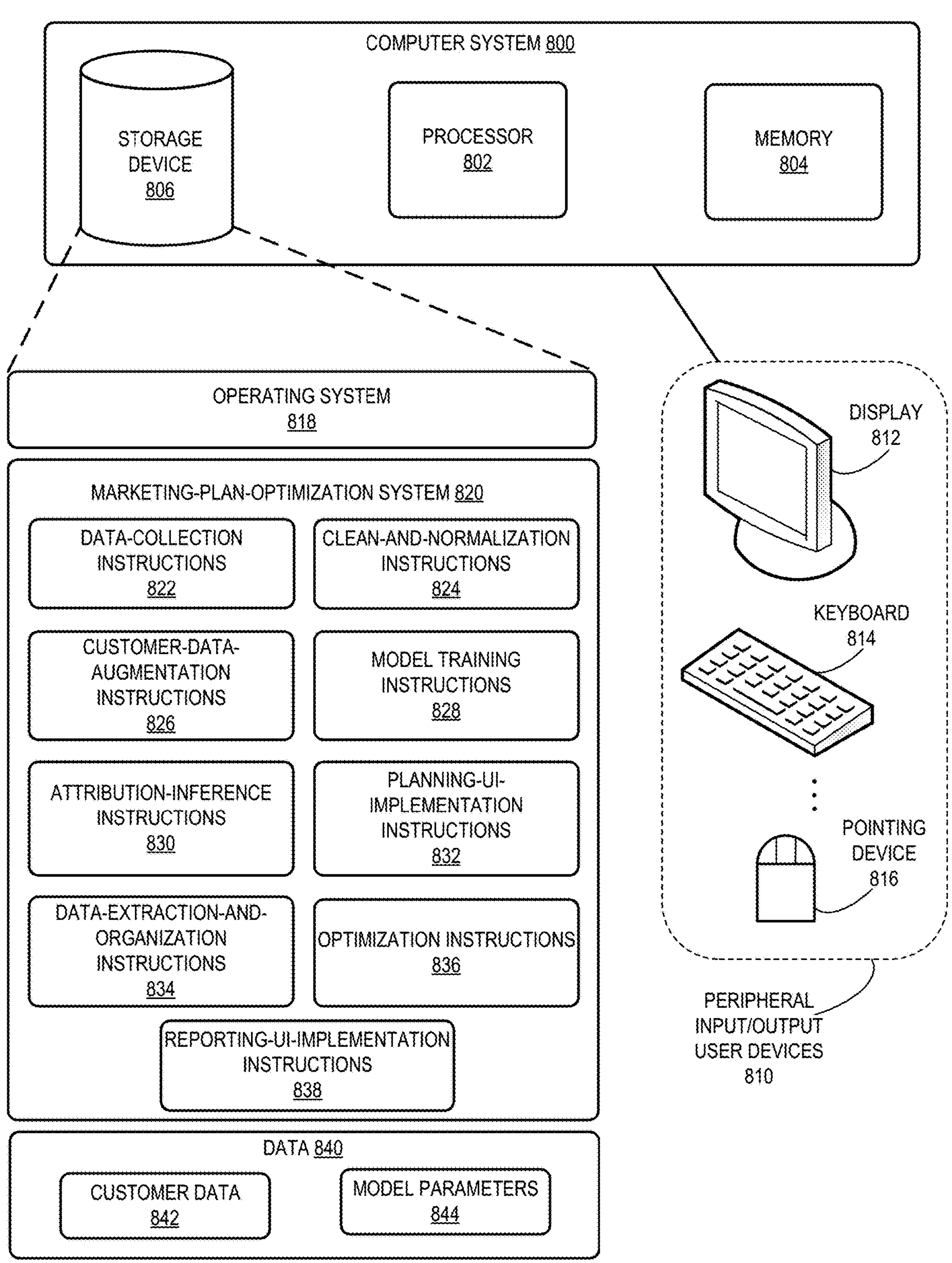
FIG. 8 illustrates an exemplary computer system that facilitates the optimization of marketing plans, according to one embodiment of the instant application.

FIG. 8 illustrates an exemplary computer system that facilitates the optimization of marketing plans, according to one embodiment of the instant application. Computer system 800 includes a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a marketing-plan-optimization system 820, and data 840. Computer system 800 can be implemented as a standalone computer, a cluster of computers, or a cloud-based computing system.

Marketing-plan-optimization system 820 can include instructions, which when executed by computer system 800, can cause computer system 800 or processor 802 to perform methods and/or processes described in this disclosure. Specifically, marketing-plan-optimization system 820 can include instructions for collecting customer data (data-collection instructions 822), instructions for cleaning and normalizing the raw customer data (clean-and-normalization instructions 824), instructions for augmenting customer data (customer-data-augmentation instructions 826), instructions for training a customer model (model training instructions 828), instructions for inferring attribution (attribution-inference instructions 830), instructions for implementing a scenario-planning UI (planning-UI-implementation instructions 832), instructions for extracting and organizing data according to a planned scenario (data-extraction-and-organization instructions 834), instructions for optimizing an initial marketing plan according to the plan goal and constraints (optimization instructions 836), and instructions for implementing a result-reporting UI (reporting-UI-implementation instructions 838). Data 840 can include customer data 842 and parameters of the various models 844.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:

establishing data-acquisition links to a plurality of data sources;

ingesting historical customer data from the data sources;

in response to identifying a gap in the historical customer data, generating synthesized customer data to fill the identified gap, wherein generating the synthesized customer data comprises executing a generative data-augmentation and training process to iteratively train a customer model based at least on the historical customer data and the generated synthesized customer data, and wherein iteratively training the customer model comprises:

applying an initial customer model to generate an initial set of synthesized customer data, combining the historical customer data with the initial set of synthesized customer data, updating the initial customer model based on the combined data, and generating additional synthesized customer data using the updated customer model;

obtaining an initial marketing plan, which specifies a plan goal and one or more constraints;

performing an optimization process based on the initial marketing plan, the customer model, and the attribution model; and generating and presenting, via a reporting user interface (UI), a report based on the optimization process, the report comprising an optimized marketing plan, thereby facilitating future marketing efforts based on the optimized marketing plan.

2. The computer-implemented method of claim 1, wherein training the customer model further comprises performing Maximum a Posterior (MAP) estimation or a variation of Monte Carlo sampling.

3. The computer-implemented method of claim 1, wherein the customer data comprises customer behavior data associated with a plurality of media channels, and wherein the plurality of data sources comprise at least a first-party data source, a data source associated with an advertisement platform, and a third-party data source.

4. The computer-implemented method of claim 1, wherein the plan goal comprises a budget goal, a conversion goal, or both; and wherein the constraints comprise one or more of a time constraint, a budget constraint, and a performance constraint associated with one or more key performance indicators (KPIs).

5. The computer-implemented method of claim 1, wherein obtaining the initial marketing plan comprises presenting a scenario-planning user interface (UI) to allow a user to input the plan goal and the constraints.

6. The computer-implemented method of claim 5, wherein the scenario-planning UI comprises a category-selection drop-down menu to allow the user to select a planning category from a plurality of planning categories.

7. The computer-implemented method of claim 6, wherein the plurality of planning categories comprise one or more of:

media type;

media market;

advertisement platform;

media channel;

tactic; and country.

8. The computer-implemented method of claim 5, wherein the scenario-planning UI comprises a plan detail UI element to allow the user to edit the initial marketing plan by adjusting budget allocation across a plurality of subcategories associated with the selected planning category.

9. The computer-implemented method of claim 8, wherein the optimized marketing plan comprises a re-allocation of the budget across the plurality of subcategories; and wherein the report comprises a performance comparison between the optimized marketing plan and the initial marketing plan.

10. A non-transitory computer-readable storage medium storing instructions that when executed by a processor cause the processor to perform a method, the method comprising:

establishing data-acquisition links to a plurality of data sources;

ingesting historical customer data from the data sources;

in response to identifying a gap in the historical customer data, generating synthesized customer data to fill the identified gap, wherein generating the synthesized customer data comprises executing a generative data-augmentation and training process to iteratively train a customer model based at least on the historical customer data and the generated synthesized customer data, and wherein iteratively training the customer model comprises:

applying an initial customer model to generate an initial set of synthesized customer data, combining the historical customer data with the initial set of synthesized customer data, updating the initial customer model based on the combined customer data, and generating additional synthesized customer data using the updated customer model;

obtaining an initial marketing plan, which specifies a plan goal and one or more constraints;

performing an optimization process based on the initial marketing plan and the customer model; and generating and presenting, via a reporting user interface (UI), a report based on the optimization process, the report comprising an optimized marketing plan, thereby facilitating future marketing efforts based on the optimized marketing plan.

11. The non-transitory computer-readable storage medium of claim 10, wherein training the customer model further comprises performing Maximum a Posterior (MAP) estimation or a variation of Monte Carlo sampling.

12. The non-transitory computer-readable storage medium of claim 10, wherein the customer data comprises customer behavior data associated with a plurality of media channels, and wherein the plurality of data sources comprise at least a first-party data source, a data source associated with an advertisement platform, and a third-party data source.

13. The non-transitory computer-readable storage medium of claim 10, wherein the plan goal comprises a budget goal, a conversion goal, or both; and wherein the constraints comprise one or more of a time constraint, a budget constraint, and a performance constraint associated with one or more key performance indicators (KPIs).

14. The non-transitory computer-readable storage medium of claim 10, wherein obtaining the initial marketing plan comprises presenting a scenario-planning user interface (UI) to allow a user to input the plan goal and the constraints.

15. The non-transitory computer-readable storage medium of claim 14, wherein the scenario-planning UI comprises a category-selection drop-down menu to allow the user to select a planning category from a plurality of planning categories, and wherein the plurality of planning categories comprise one or more of:

media type;
media market;
advertisement platform;
media channel;
tactic; and
country.

16. The non-transitory computer-readable storage medium of claim 14, wherein the scenario-planning UI comprises a plan detail UI element to allow the user to edit the initial marketing plan by adjusting budget allocation across a plurality of subcategories associated with the selected planning category.

17. The non-transitory computer-readable storage medium of claim 16, wherein the optimized marketing plan comprises a re-allocation of the budget across the plurality of subcategories; and wherein the report comprises a performance comparison between the optimized marketing plan and the initial marketing plan.

18. A computing system, comprising:

a processor;

a memory coupled to the processor and storing instructions that when executed by the processor cause the processor to perform a method, the method comprising:

establishing data-acquisition links to a plurality of data sources;

ingesting historical customer data from the data sources;

in response to identifying a gap in the historical customer data, generating synthesized customer data to fill the identified gap, wherein generating the synthesized customer data comprises executing a generative data-augmentation and training process to iteratively train a customer model based at least on the historical customer data and the generated synthesized customer data, and wherein iteratively training the customer model comprises an iterative process comprising:

applying an initial customer model to generate an initial set of synthesized customer data, combining the historical customer data with the initial set of synthesized customer data, updating the customer model based on the combined customer data, and generating additional synthesized customer data using the updated customer model;

obtaining an initial marketing plan, which specifies a plan goal and one or more constraints;

performing an optimization process based on the initial marketing plan and the customer model; and generating and presenting, via a reporting user interface (UI), a report based on the optimization process, the report comprising an optimized marketing plan, thereby facilitating future marketing efforts based on the optimized marketing plan.

* * * * *